United States Patent [19]

Paris, II

[11] Patent Number: 5,088,054

[45] Date of Patent: Feb. 11, 1992

[54] COMPUTER GRAPHICS HIDDEN SURFACE REMOVAL SYSTEM

[76] Inventor: Earl A. Paris, II, 12555 Euclid #108, Garden Grove, Calif. 92640

[21] Appl. No.: 192,009

[22] Filed: May 9, 1988

[51] Int. Cl.$^5$ .............................................. G06F 15/72
[52] U.S. Cl. ..................................... 395/121; 340/729
[58] Field of Search ................. 382/41; 340/750, 729, 340/747; 364/413.19, 521, 522

[56] References Cited

U.S. PATENT DOCUMENTS

| | | | |
|---|---|---|---|
| 3,602,702 | 8/1972 | Warnock | 364/522 |
| 3,816,726 | 6/1974 | Sutherland | 382/41 |
| 3,889,107 | 6/1975 | Sutherland | 382/41 |
| 4,475,104 | 10/1984 | Shen | 340/729 |
| 4,594,673 | 6/1986 | Holly | 364/522 |
| 4,625,289 | 11/1986 | Rockwood | 364/522 |
| 4,721,952 | 1/1988 | Huber | 340/729 |
| 4,827,413 | 5/1989 | Baldwin et al. | 364/413.19 |

Primary Examiner—Gary V. Harkcom
Assistant Examiner—Raymond J. Bayerl
Attorney, Agent, or Firm—Hawes & Fischer

[57] ABSTRACT

A computer graphics hidden surface removal system and process are provided for processing a display list representing a plurality of objects to provide an image on a display device. A primary viewing volume is initially determined from a desired viewpoint by defining top, bottom, left side, right side, primary far and primary near clipping planes. The viewing volume is then divided into a plurality of slices including a first slice at the primary far clipping plane and a last slice at the primary near clipping plane. The other slices are in between. Signals representing portions of the objects found in each of the slices are loaded into a display memory buffer one slice at a time progressing sequentially through the slices starting with the first slice and ending with the last slice.

10 Claims, 12 Drawing Sheets

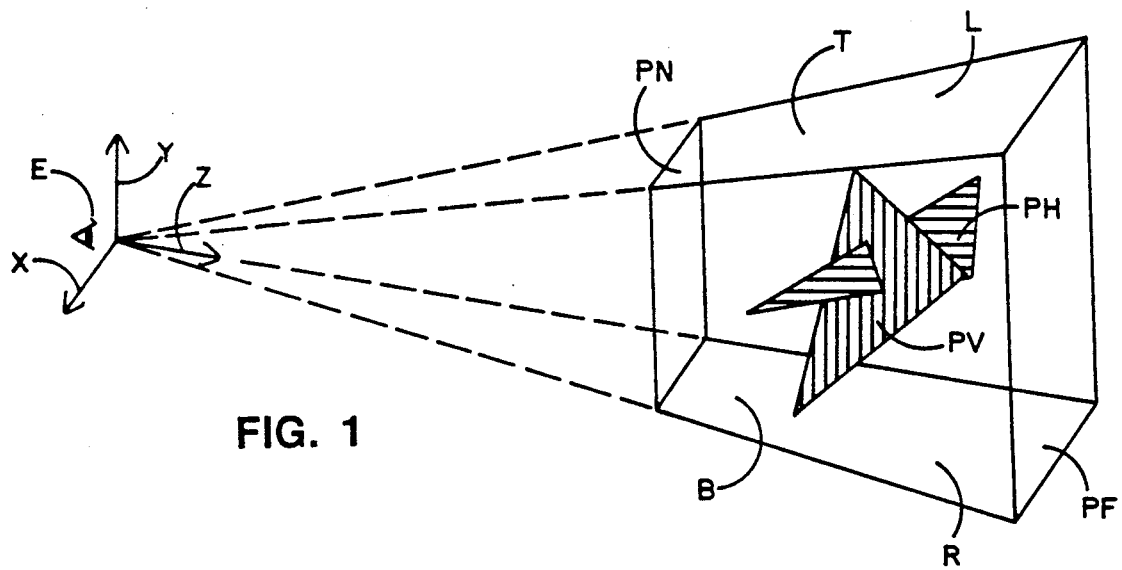
FIG. 1
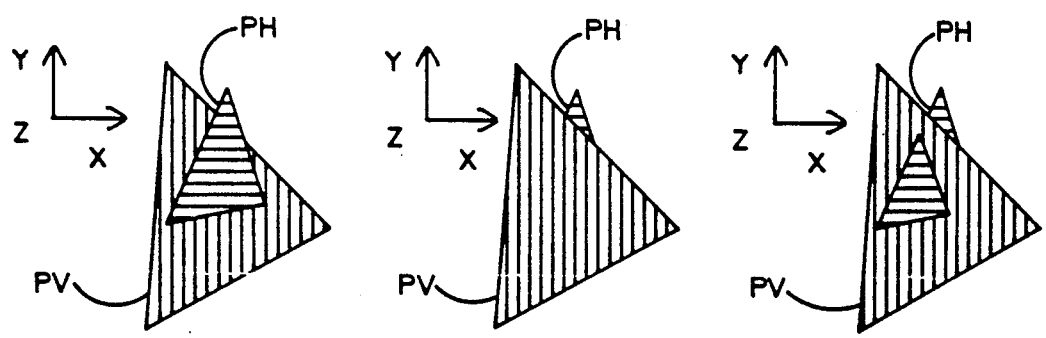
FIG. 3
(PRIOR ART)
FIG. 4
(PRIOR ART)
FIG. 5

  
FIG. 14  FIG. 15  FIG. 16
  
FIG. 17  FIG. 18  FIG. 19
FIG. 20

| | Number of objects in this slice | First object pointer | Second object pointer | | Kth object pointer |
|---|---|---|---|---|---|
| 1st Slice P0 to P1 -> | 0 | | | | | ← Z_Schedule[0][0]
| | | ← | | | | ← Z_Schedule[0][1]
| 2nd Slice P1 to P2 -> | 0 | | | | |
| 3rd Slice P2 to P3 -> | 1 | PH | | | |
| 4th Slice P3 to P4 -> | 2 | PV | PH | | | ← Z_Schedule[3][2]
| 5th Slice P4 to P5 -> | 2 | PV | PH | | |
| 6th Slice P5 to P6 -> | 2 | PV | PH | | |
| 7th Slice P6 to P7 -> | 2 | PV | PH | | |
| 8th Slice P7 to P8 -> | 1 | PH | | | |
| 9th Slice P8 to P9 -> | 0 | | | | |
| 10th Slice P9 to P10 -> | 0 | | | | |

Z_Schedule

FIG. 23

COMPUTER GRAPHICS HIDDEN SURFACE REMOVAL SYSTEM

FIELD OF THE INVENTION

This invention relates to the field of computer graphics and more particularly to a system for removing hidden surfaces.

DESCRIPTION OF RELATED ART

Computer graphics often concerns the display of one or more three-dimensional objects on a two-dimensional display device. The Hidden Surface/Line Problem involves identifying and eliminating those electrical signals representing three-dimensional objects or portions thereof which would obscure other objects that are nearer to the current viewpoint in a particular computer generated image. A comprehensive description of the Hidden Surface/Line Problem is given in, *Computer Graphics A Programming Approach* by Steven Harrington ©1983, published by McGraw-Hill.

In its simplest form the problem can be thought of as an ordering problem. If the signals stored within a display list, representing the geometry to be displayed, could be processed in a specific order, the registers which correspond to each pixel upon the display device, would be loaded with either the correct color or color index value, and as each subsequent geometric object in the display list was processed through the system, these registers would be updated with the color or color index value of the geometry which was closer to the view point. Thus, the correct image would be obtained. This method has been referred to as Painter's method because as each pixel's register is loaded with the new color value, it gives the appearance of over painting the other represented geometry. This method, however, is only valuable for the most simple of represented geometry. In the past, excellent computer images were created by carefully defining the geometry; such that a simple ordering of the list of geometric objects within a scene could solve the Hidden Surface/Line Problem. But as computer graphics have become more available to designers and noncomputer graphics experts through tools such as modern Computer Aided Design (CAD) systems, it is more typical to find geometric objects which pierce one another or those which suffer from cyclic overlap i.e. interleave one another. It is for reasons such as this, that the Hidden Surface/Line Problem has become ever more important.

Solutions to the problem for more general geometry, including geometric objects which penetrate one another and suffer from cyclic overlap, are known within the prior art. One method as described in U.S. Pat. No. 3,889,107 to Sutherland, entitled "System of Polygon Sorting by Dissection", involves the use of cutting planes which pass from the view point through each edge of each polygon within the display list. Each polygon within the display list is checked against each of these cutting planes and where an intersection is found to exist, the polygon is dissected into two polygons; each of which is subsequently dealt with separately. Thus the system, in effect, converts one display list which may contain penetrating or cyclic geometry into a second list which is more simple and can be dealt with as described above using the Painters method. Unfortunately, this Sutherland '107 method can substantially increase the size of the display list by taking what was a relatively small number of polygons and creating a much larger number which subsequently increases the system memory requirements and can also reduce system performance. The modification of the display list in itself can prove a problem at times. For example, consider a display list that has been created by an application such as a CAD system. In order to obtain an image of this geometry using the Sutherland '107 method, the display list is dissected into a simpler list to avoid hidden surface problems for display purposes. This new list, although providing a visually correct image, will in fact be more complex for the CAD application because of its modification, thus requiring the keeping of both lists. If a geometry change is desired, it will have to be made to the original list. Further disadvantages occur when dealing with highly curved surfaces such as arcs, circles, and higher order parametric surfaces. The necessary number of cutting planes along each edge of these curved surfaces can prove prohibitive.

Another method for dealing with the more general geometry is disclosed in U.S. Pat. No. 3,602,702 to Warnock entitled "Electronically Generated Perspective Images". The method involves the subdivision of the two-dimensional display plane into smaller and smaller areas with the testing, cutting, sorting and display of two-dimensional projections of the three-dimensional polygons within this display plane. In addition to its complex polygon testing, the method requires the creation and management of two-dimensional polygon lists in which polygons are ultimately cut or subdivided to fit within the smaller and smaller display screen areas. Again, the problem of display list modification and increase in display list size is produced.

Another method is the use of systems having Z buffers such as disclosed in U.S. Pat. No. 4,475,104 to Shen entitled "Three-dimensional Display System" and U.S. Pat. No. 4,625,289 to Rockwood entitled "Computer Graphics System of General Surface Rendering by Exhaustive Sampling". Z buffer systems provide two registers for each pixel on a display screen: a color register and a depth register. The color register contains the color or color index value of the point of the object being represented at the subject pixel. The depth register contains the depth of the point of the object being represented at the subject pixel from the current viewpoint. As the display list is processed and new information is presented for a new object at a given pixel location, the new information as to the relative depth of the new object at the subject point is compared to the relative depth of the old object at the subject point. If the old information represents a point closer to the viewer than the new information, the new information is discarded. If the new information represents a point closer to the viewer than the old information, the new information as to the depth is loaded into the depth register for the pixel and the new information as to color is loaded into the color register for the pixel.

Systems using Z buffers do not require modification of the display list nor do they require the presorting of the list. However, they do require sufficient memory capacity to perform the required operations and these requirements are substantial. For example, a display system having 2048 by 2048 pixels with 32 bit accuracy requires a Z buffer having in excess of $1.3 \times 10^{8th}$ bits of memory. In addition, Z buffers tend to be comparatively slow due to the fact that information for each pixel must be reexamined for each new object on the display list. The trend toward higher and higher resolution images will tend to compound these problems.

Another problem inherent with Z buffers is the inflexibility of the level of precision. The whole display must be at the same level of precision even though satisfactory results could be achieved if major areas of a display list are displayed at a relatively low level of precision while only a few areas are displayed at a high level of precision. If a Z buffer is used, the entire graphic display must be at the level requiring the greatest precision. The net result is that a larger Z buffer is required than would be necessary if there were a method for varying the precision between areas.

Another problem with Z buffer system is the necessity for resetting both the large number of pixel display memory registers and each of the Z buffer memory registers before creating an image. This must be done in order to achieve a uniform background color on the display screen and to start each pixel's Z register with an appropriate starting value. The time required to rest the registers is therefore double the time required to reset the registers on a system not having a Z buffer.

SUMMARY OF THE INVENTION

The present invention is directed to a computer graphics hidden surface removal system for processing a display list to present the image of a plurality of objects on a display device. A primary viewing volume is initially determined from a desired viewpoint by defining top, bottom, left side, right side, primary far, and primary near clipping planes. The viewing volumes is then divided into a plurality of slices including a first slice at the primary far clipping plane and a last slice at the primary near clipping plane. The other slices are in between. Signals representing portions of the objects found in each of these slices are loaded into a display memory buffer, one slice at a time, progressing sequentially through the slices starting with the first slice and ending with the last slice. A pixel register having a pre-existing value is overwritten by a signal for the same register from a later slice. The selection of sufficiently thin slices assures elimination of any hidden surface/line problems.

In accordance with one important aspect of the invention, the primary viewing volume is divided into the slices by the sequential movement of the far and near clipping planes. A first slice near clipping plane is set at a position equal to the first slice far clipping plane minus the thickness of the first slice. All subsequent slices are determined by setting the far clipping plane for the new slice at the same position as the position of the near clipping plane for the preceding slice. The new near clipping plane is then determined by setting the near clipping plane at a position equal to the far clipping plane for the new slice minus the thickness of the new slice. The last slice far clipping plane is set at a position equal to the position of the near clipping plane of the preceding slice. The last slice near clipping plane is set at a position equal to the last slice far clipping plane minus the thickness of the last slice. In this manner, the viewing volume is entirely cut up into slices.

In accordance with another important aspect of the invention, a means is provided to divide the primary viewing volume into a plurality of slices having equal thicknesses. Alternatively, the viewing volume is divided into slices not necessarily having equal thicknesses. Generally, the more slices in a given length of the primary viewing volume, the greater the precision in the combined representation of the objects on the display screen. The different slice thicknesses allow only a portion of a display list to be enhanced by cutting thinner slices without enhancing all of the other portions that do not require such detail.

In a preferred embodiment, a means is provided for preprocessing the display list to establish a pointer for each of the plurality of objects positioned within each of the slices. Then as the display list is processed to develop signals for each slice, access is made immediately to the objects in the particular slice. Other features and advantages of the present invention will become apparent from the following detailed description, taken in conjunction with the accompanying drawings, which illustrate by way of example, the principles of the invention.

BRIEF DESCRIPTION OF DRAWINGS

FIG. 1 is a graphic representation of a viewing volume containing two intersecting polygons;

FIG. 3 is one graphic representation of the polygons of FIG. 1 from viewpoint E;

FIG. 4 is another graphic representation of the polygons of FIG. 1 from viewpoint E;

FIG. 5 is another graphic representation of the polygons of FIG. 1 from viewpoint E;

FIG. 14 is the same as FIG. 9;

FIG. 15 is the same as FIG. 11;

FIG. 16 is the same as FIG. 13;

FIG. 17 is a graphic representation of the sixth slice from viewpoint E;

FIG. 18 is a graphic representation of the seventh slice from viewpoint E;

FIG. 19 is a graphic representation of the eighth slice from viewpoint E;

FIG. 20 is a series combining, from left to right, FIG. 14, FIGS. 14 and 15; FIGS. 14, 15 and 16; FIGS. 14, 15 16 and 17; FIGS. 14, 15, 16 17 and 18; and FIGS. 14, 15, 16, 17, 18, and 19;

FIG. 23 is a chart of the Z schedule for another embodiment of the present invention;

DESCRIPTION OF THE PREFERRED EMBODIMENT

Referring initially to FIG. 1, there is illustrated a graphic representation of a primary viewing volume with viewpoint E of a viewer and defined by six clipping planes: top T, bottom B, left L, right R, primary far PF and primary near PN. The three-dimensions are denoted by the horizontal axis represented by arrow X, the vertical axis represented by arrow Y, and the depth represented by arrow Z. Inside the primary viewing volume are two three-dimensional polygons: a polygon with horizontal stripes PH and a polygon with vertical stripes PV. Polygons PH and PV intersect with other creating one of the classic hidden surface/line graphics problems when they are displayed.

A viewing volume as shown in FIG. 1 is well known in the prior art. The viewing volume is used to bound that section or group of geometric objects on a display list which are to appear upon the display device. Those objects outside the volume are not displayed. Those objects partially within the volume and partially outside are clipped with only the portions inside the volume being displayed. One method for creating such a viewing volume and cutting the objects is disclosed in U.S. Pat. No. 3,816,726 to Sutherland et al. entitled "Computer Graphics Clipping System for Polygons".

Figure 2:
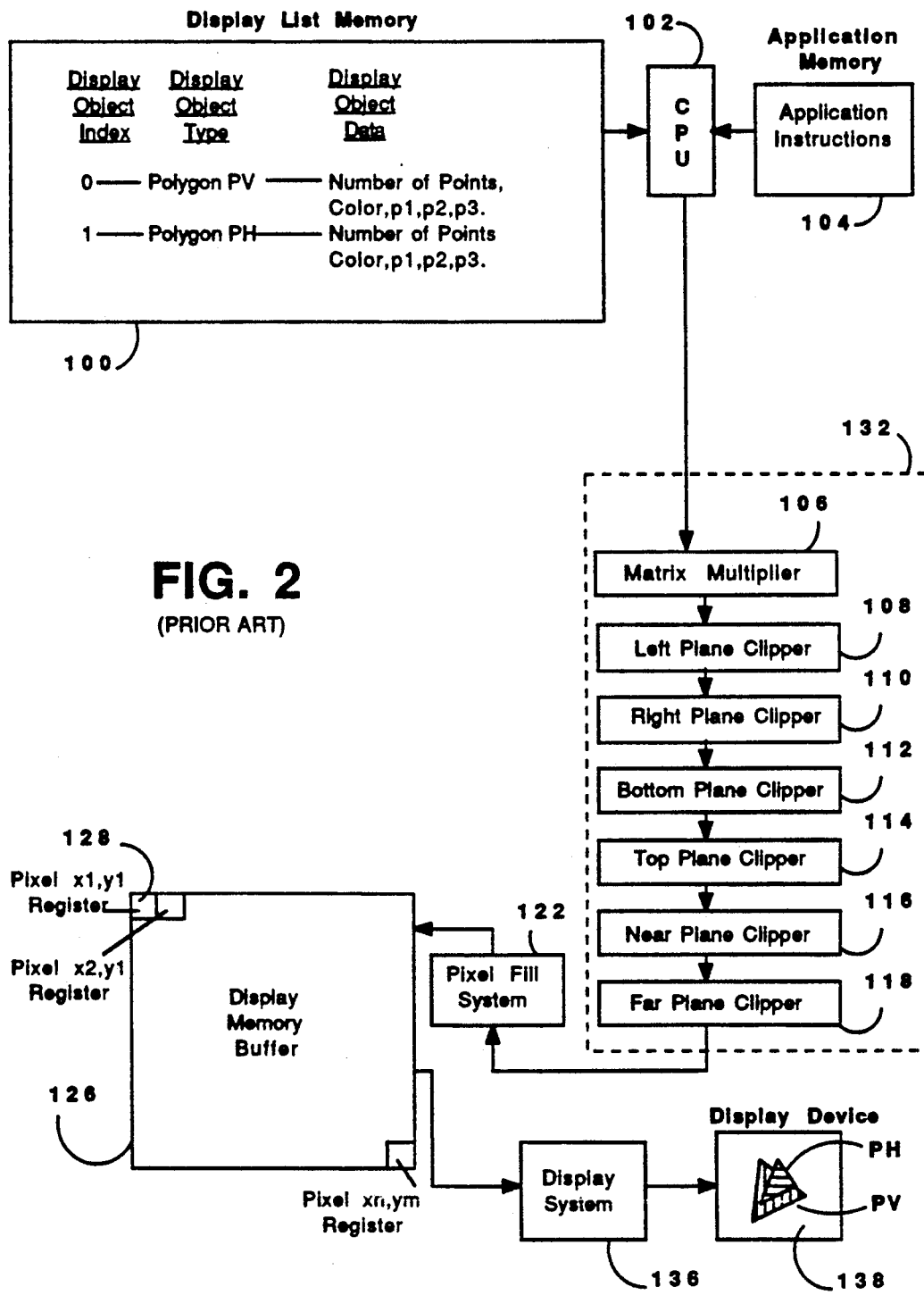
FIG. 2 is a block diagram of a typical prior art computer graphics system.

FIG. 2 is a block diagram of a typical prior art computer graphics system useful in defining the primary viewing volume of FIG. 1 and displaying the subject polygons PH and PV on a display from the viewpoint E. Three possible results are shown in FIGS. 3, 4, and 5 depending upon the ordering of the display list. In FIG. 2, block 100 is an area of computer memory containing a display list for the two polygons PH and PV. If the display list element number 0 representing polygon PV is processed first by the central processing unit (CPU) 102 in accordance with the application instructions 104, the signals representing the geometry of the polygon PV pass through a matrix multiplier 106 and exit in the new viewing coordinate system in a process well defined in the prior art. The signals then proceed through each of the clippers: left plane clipper 108, right plane clipper 110, bottom plane clipper 112, top plane clipper 114, near plane clipper 116, and far plane clipper 118. In the present example, the signals pass through all of the clippers unchanged because the polygon PV is located entirely within the primary viewing volume. The matrix multiplier 106 and clippers 108 through 118 comprise a clipping subsystem 132 and provide a means for determining the primary viewing volume. Such a clipping subsystem 132 is described in Sutherland et al. '726. A pixel fill system 122 then proceeds to load each of the affected pixel registers 128 within a display memory buffer 126 with the appropriate color or color index value. A display system 136 processes the display member buffer 126 to create a representation of the polygon PV on a display device 138 from the viewpoint E of the viewer in FIG. 1. (It will be appreciated that the display memory 126 is typically set to a default value to clear the display screen 138 prior to the processing of the display list.)

One polygon PV is displayed, the processing of the display list is continued through list element number 1 representing polygon PH. When the signals for polygon PH reach the pixel fill system 122, the system will load each of the affected pixel registers 128 within the display memory buffer 126 with the appropriate color or color index value for polygon PH. If one of the pixel registers previously represented a point on polygon PV and is now needed to represent polygon PH, it is overwritten with the information for polygon PH. When the resulting combination image of polygons PV and PH is presented on the display device 138, the previous view of polygon PV will be overpainted with the view of polygon PH on top.

FIG. 3 is a larger graphic representation of the display device 138 of FIG. 2. The result gives the impression that polygon PH is closer to viewpoint E than polygon PV while, in fact, the two polygons pierce each other as shown in FIG. 1. The classic hidden surface/line problem of computer graphics is thereby illustrated.

FIG. 4 is a graphic representation of the result if the order of the display list is changed to process display list element 1 representing polygon PH before display list element 0 representing polygon PV. Obviously reordering of the display list does not provide a better solution. Polygon PV now appears to be closer to viewpoint E than polygon PH.

FIG. 5 is the correct image that should be presented on the display device to accurately represent the polygons PV and PH from viewpoint E in FIG. 1. One method disclosed in the prior art as noted above for obtaining the image of FIG. 5 is to cut the polygons PV and PH within the display list 100 into smaller polygons which do not penetrate one another. This method increases the complexity and length of the display list and does not work well on circles, arcs, splines, and other complicated curved objects. Another method for obtaining the correct image of FIG. 5 is to use a graphics system having a Z buffer.

Figure 6:
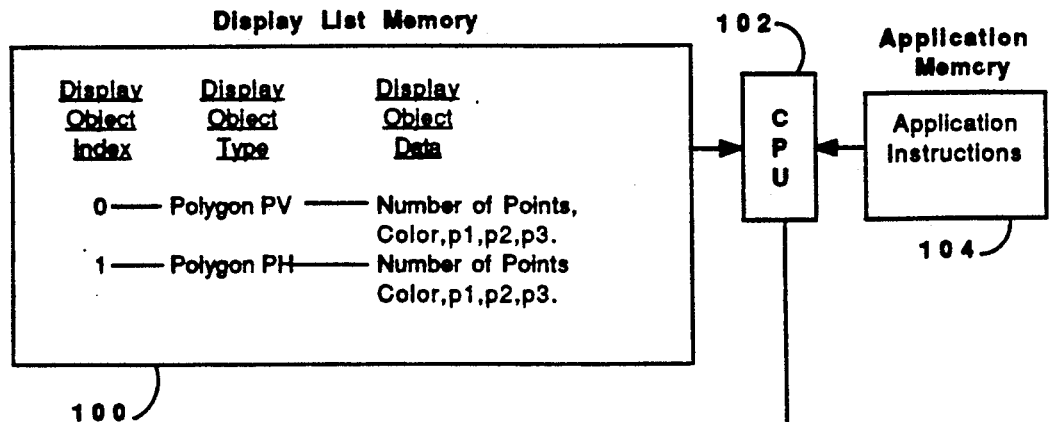
FIG. 6 is a block diagram of a typical prior art computer graphics system having a Z buffer.
Figure 6:
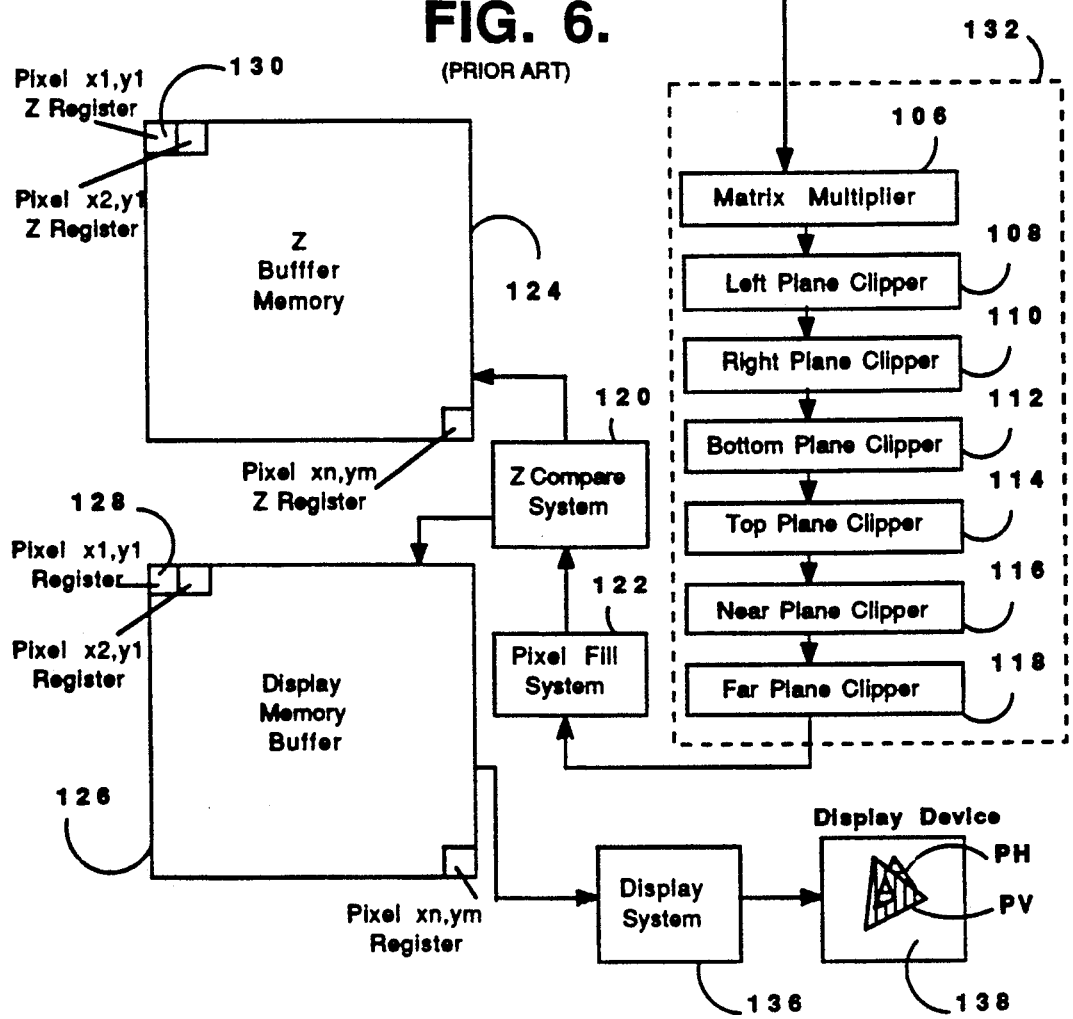

FIG. 6 is a block diagram computer graphics system having a Z buffer. FIG. 6 is the same as FIG. 2 except for the addition of a Z buffer memory 124 and a X compare system 120. The Z buffer works by comparing the value in a particular pixel's Z buffer memory register 130, representing the relative distance of the subject point from the viewpoint E, to the newly calculated relative distance of the new subject point which is presented. If the calculated value of the new point is closer to the viewpoint E, its color value is stored in the appropriate pixel display memory register 128 and its relative distance from the viewpoint E is stored in the appropriate Z buffer memory register 130. If, on the other hand, the calculated value of the new point is farther from the viewpoint E than the existing value with the Z buffer memory register 130, the new values are not stored.

Figure 7:
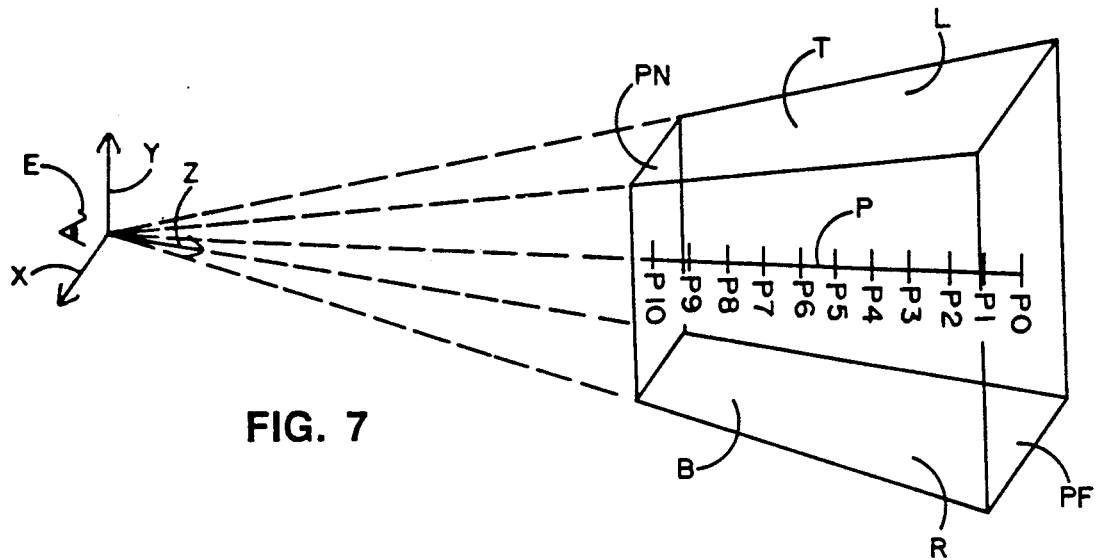
FIG. 7 is a graphic representation of the viewing volume of FIG. 1 divided in accordance with the present invention.

FIG. 7 is a graphic representation of the viewing volume of FIG. 1 divided in accordance with the present invention. Instead of processing the primary viewing volume as a whole, as is done with all prior systems, the present system slices up the primary viewing volume in parallel slices proceeding from the previously defined primary far clipping plane PF to the previously defined primary near clipping plane PN. The display list is then processed at each slice before proceeding to the next nearer slice. As each slice is processed, the resulting graphic images are depicted on a display device and the display device is not cleared or erased between slices. If a point on an object in a subsequent slice occupies the same pixel as an object in a previous slice, the new information is written into the pixel's register. Comparison of relative distances at each pixel is not required because points coming in subsequent slices are closer. By adjusting the number of slices, all hidden surface/line problems are eliminated or reduced to insignificance. For example, in the process of creating an ordinary graphic display on a display device, the primary viewing volume might be divided up into 500 slices. Even the recycling of the display list 500 times can be significantly faster than previous polygon division methods and can be markedly faster than a graphics display system having a Z buffer. No Z buffer is required by the present invention because no Z distance comparisons are made. Furthermore, at no time is the display list modified.

In FIG. 7, the primary viewing volume is divided into only ten slices for purposes of illustration. A reference line P is added through the center of the primary viewing volume intersecting viewpoint E. The line P passes through the primary far clipping PF at point P0 and the primary near clipping plane PN at point P10. The line P between points P0 and P10 is divided by nine equally spaced points P1 through P9. Additional planes that are not shown pass through each of the point P1 through P9 parallel to the primary far and primary near clipping planes to create the slices. The thickness through any given slice being the same as the distance between far and near clipping planes for that size. In FIG. 7, the slices all have equal thicknesses.

The first slice is between the primary far clipping plane PF and the plane through the point P1. The second slice is between the planes through the points P1 and P2. The third slice is between the planes through the points P2 and P3. The fourth slice is between the planes through the points P3 and P4. The fifth slice is between the planes through the points P4 and P5. The sixth slice is between the planes through the points P5 and P6. The seventh slice is between the planes through the points P6 and P7. The eighth slice is between the planes through the points P7 and P8. The ninth slice is between the planes through the points P8 and P9. And the tenth and last slice is between the plane through the point P9 and the primary near clipping plane PN.

Figure 8:
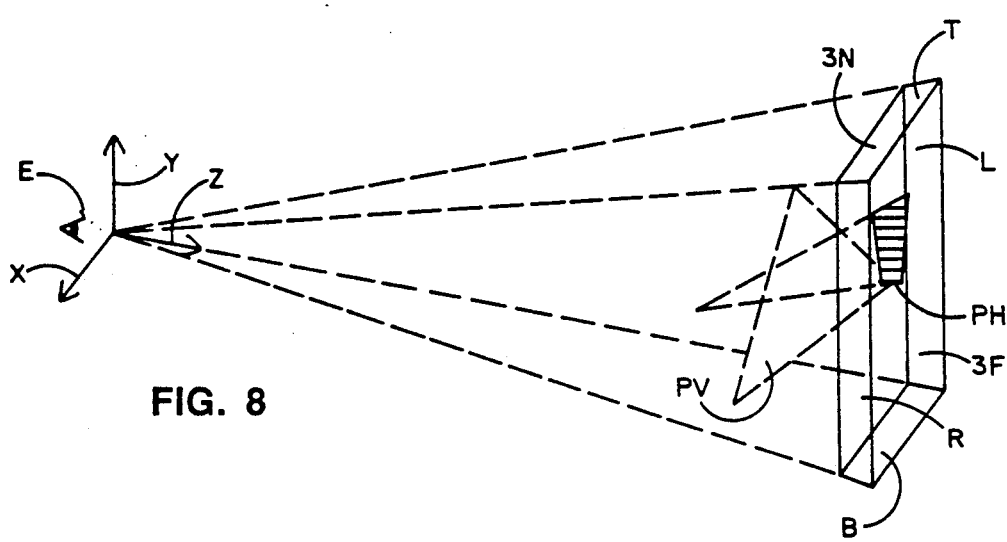
FIG. 8 is a graphic representation of the third slice of FIG. 7 with the polygons of FIG. 1.

FIGS. 8 through 20 are graphic representations of the results of using a hidden surface removal system in accordance with the present invention on the polygons PV and PH of FIG. 1. FIG. 8 actually shows the third slice (the first two slices containing no portions of the polygons PV and PH and are therefore not graphically presented). The third slice is processed electronically using a system such as shown in Sutherland et al '726 by redefining the primary viewing volume of FIG. 7 to be a temporary viewing volume equivalent to the third slice. This is done by moving the near clipping plane 3N to intersect the line P at point P3 of FIG. 7 and the far clipping plane 3F to intersect the line P at point P2. All other clipping planes remain the same, i.e. T, B, L, and R. If the display list 100 (FIG. 2) is then processed the small portion of polygon PH results. All other parts are discarded as being outside this temporary viewing volume. The remainders of polygon PH and all of polygon PV are shown in dotted outline to show the relative positioning of the small selected portion of polygon PH.

Figure 9:
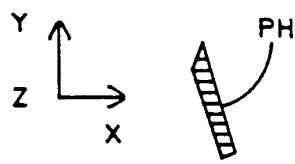
FIG. 9 is a graphic representation of the display list on an output device for the third slice of FIG. 8 from the viewpoint E.
Figure 21:
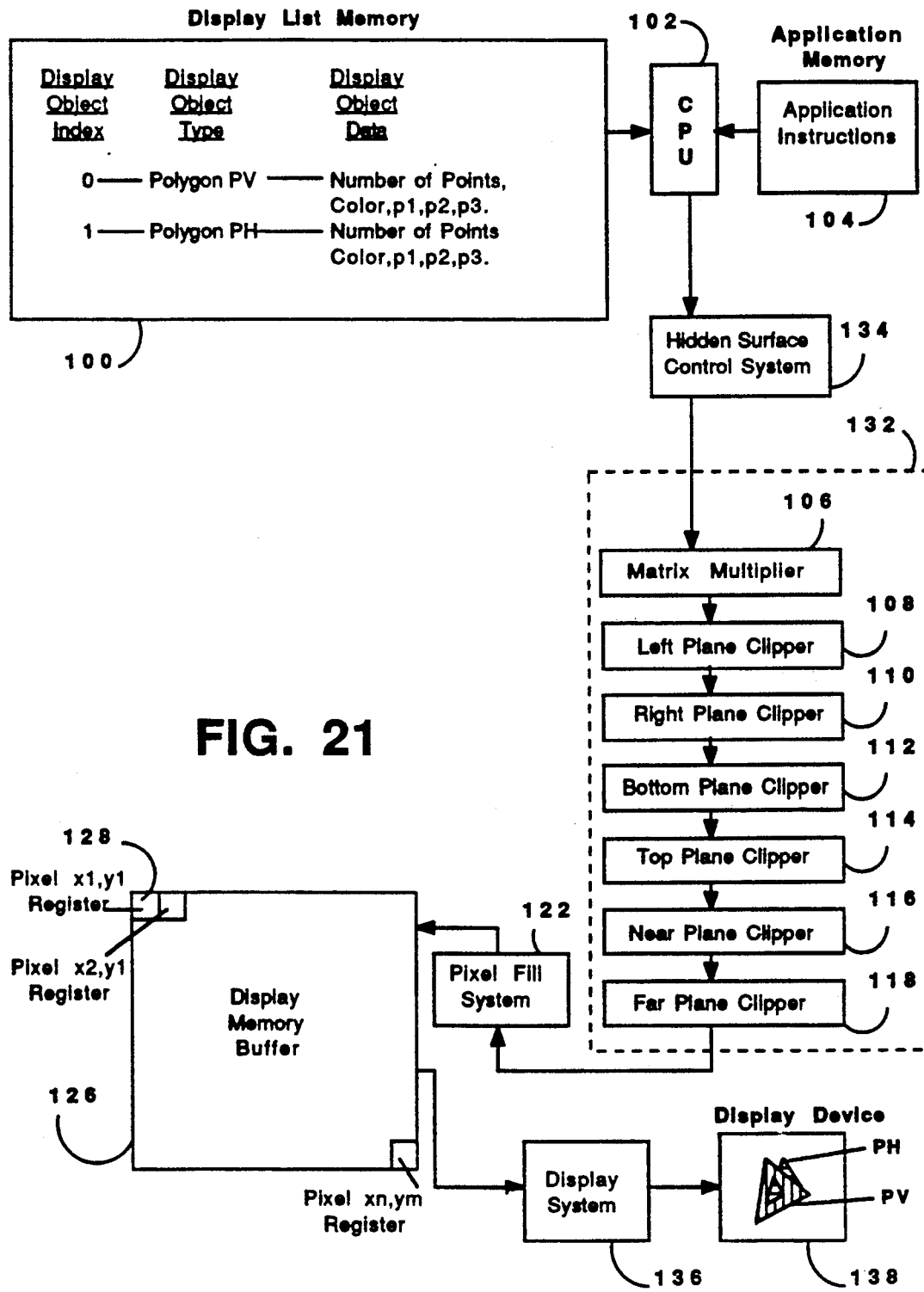
FIG. 21 is a block diagram of a computer graphic system in accordance with the present invention.

FIG. 9 shows the resulting image of the portion of polygon PH in the third slice from the viewpoint E in FIG. 8 when displayed upon the display device 138 (FIG. 21).

Figure 10:
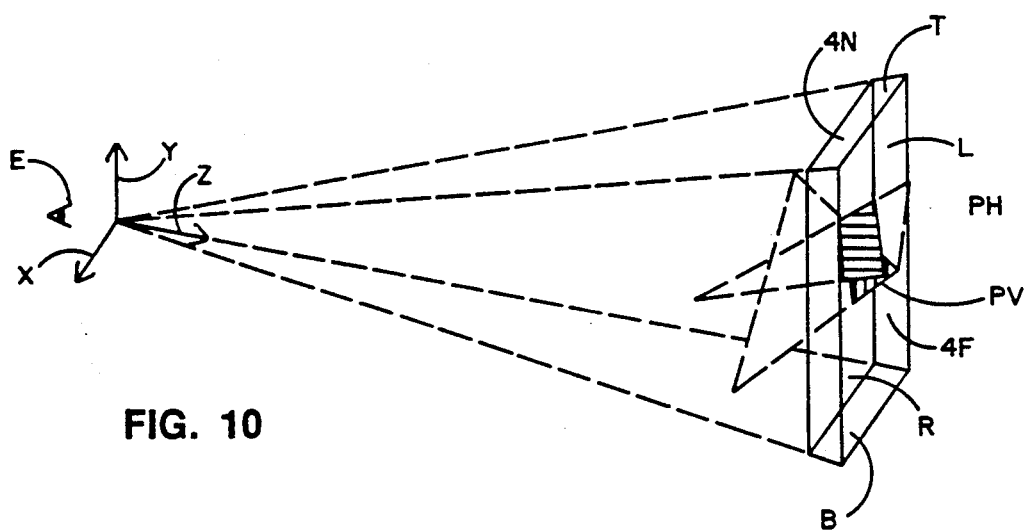
FIG. 10 is a graphic representation of the fourth slice.

FIG. 10 shows the fourth slice. The fourth slice is processed electronically by moving the near clipping plane 4N to intersect the line P at point P4 of FIG. 7 and moving the far clipping plane 4F to intersect the line P at the point P3. All other clipping planes remain the same, i.e. T, B, L, and R. If the display list is then processed, the next small portion of polygon PH and the first small portion of polygon PV result.

Figure 11:
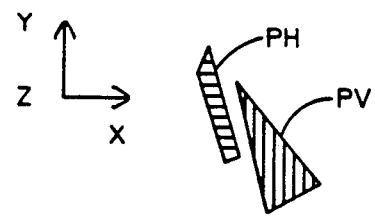
FIG. 11 is a graphic representation of the fourth slice from viewpoint E.

FIG. 11 shows the resulting image of the portions of the polygons PH and PV in the fourth slice from the viewpoint E in FIG. 10 when displayed upon the display device 138.

Figure 12:
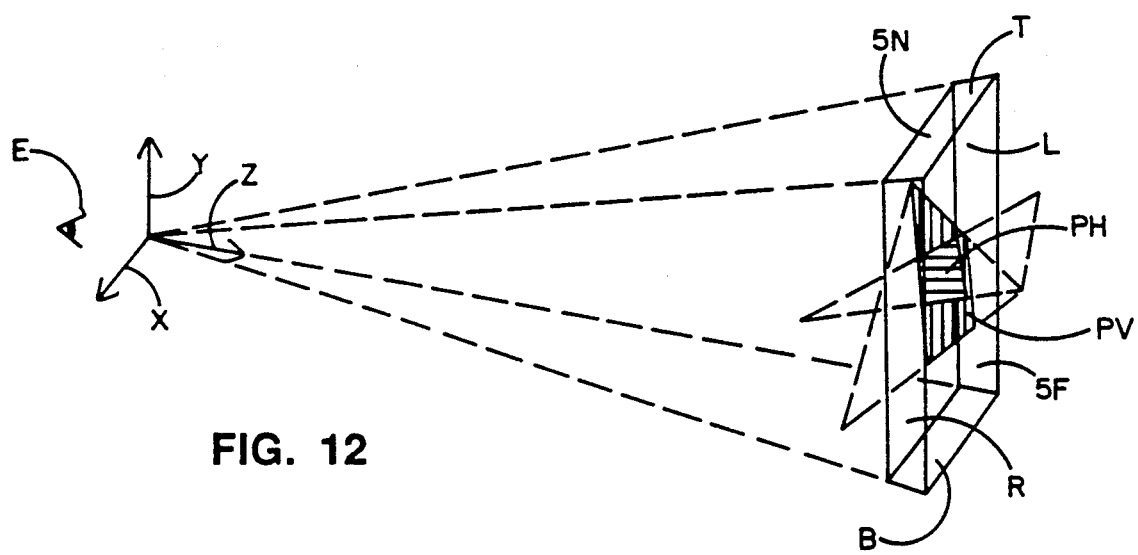
FIG. 12 is a graphic representation of the fifth slice.

FIG. 12 shows the fifth slice. The fifth slice is processed electronically by moving the near clipping plane 5N to intersect the line P at point P5 of FIG. 7 and moving the far clipping plane 5F to intersect the line P at the point P4. All other clipping planes remain the same, i.e. T, B, L, and R.

Figure 13:
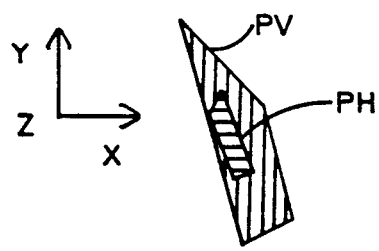
FIG. 13 is a graphic representation of the fifth slice from viewpoint E.

FIG. 13 shows the resulting image of the portions of the polygons PH and PV in the fifth slice from the viewpoint E in FIG. 12 when displayed upon the display device 138.

FIGS. 14 through 19 show images from six of the ten slices in sequence, (the other four out of ten slices contain no portions of the polygons PH or PV). FIG. 14 is a repeat of FIG. 9. FIG. 15 is a repeat of FIG. 11. FIG. 16 is a repeat of FIG. 13. These figures are repeated in order to allow comparison and assembly of all images created from the processing of the ten slices of FIG. 7. Only the sixth, seventh, and eighth slices remain to be illustrated. The canted views for these slices are not shown but would be similar to FIGS. 8, 10, and 12. FIG. 17 shows the resulting image from the sixth slice from the viewpoint E. FIG. 18 shows the resulting image from the seventh slice from the viewpoint E. FIG. 19 shows the resulting image from the eighth slice from the viewpoint E. It will be appreciated that FIGS. 14 through 19 may only be obtained by clearing the display device 138 between each slice. This being done only for the purpose of illustration.

FIG. 20 is a graphic representation of the building up of the display image on the display device 138 from left to right if the display device is not cleared between each slice. Some pixel registers 128 (FIG. 21) of the display memory buffer 126 are overwritten by new information as previously described as the combined image is accumulated. FIG. 20 combines, from left to right, FIG. 14 (slice 3); FIGS. 14 and 15 (slices 3 and 4); FIGS. 14, 15 and 16 (slices 3, 4, and 5); FIGS. 14, 15 16 and 17 (slices 3, 4, 5, and 6); FIGS. 14, 15, 16, 17 and 18 (slices 3, 4, 5, 6, and 7); and FIGS. 14, 15, 16, 17, 18, and 19 (slices 3, 4, 5, 6, 7, and 8).

It should be noted that the primary volume of FIG. 7 was divided into ten slices for the purpose of illustration only, and as the number of slices is increased, the size of the objects presented to the display memory buffer 126, for any given slice, is decreased (except for those objects which reside entirely within the slice). The number of slices can be increased until the accuracy in the image created by decreasing the thickness of the slices, equals the resolution of the display device 138. Further division will then not produce a better image. (It will be appreciated that special results may be achieved by taking the process of the present invention to the extreme where the near clipping plane and the far clipping plane occupy the same location in space for a given slice. Under these circumstances, lines that pass through the plane would be reduced to points. Polygons that pass through the plane would be reduced to lines and surfaces would be reduced to curves, etc. Those objects that fall completely within the plane, i.e. slice, would pass through in their entirety).

By going a slice at a time, the present invention allows large areas of the display memory buffer 126 to be processed at a time. Entirely eliminated is the method of the Z buffer, requiring the comparison of a pixel at a time or the resetting of the entire Z buffer memory 124 between each image.

FIG. 21 is block diagram of the computer graphics hidden surface removal system. FIG. 21 is the same as FIG. 2 except for the addition of the hidden surface system control 134.

Figure 22:
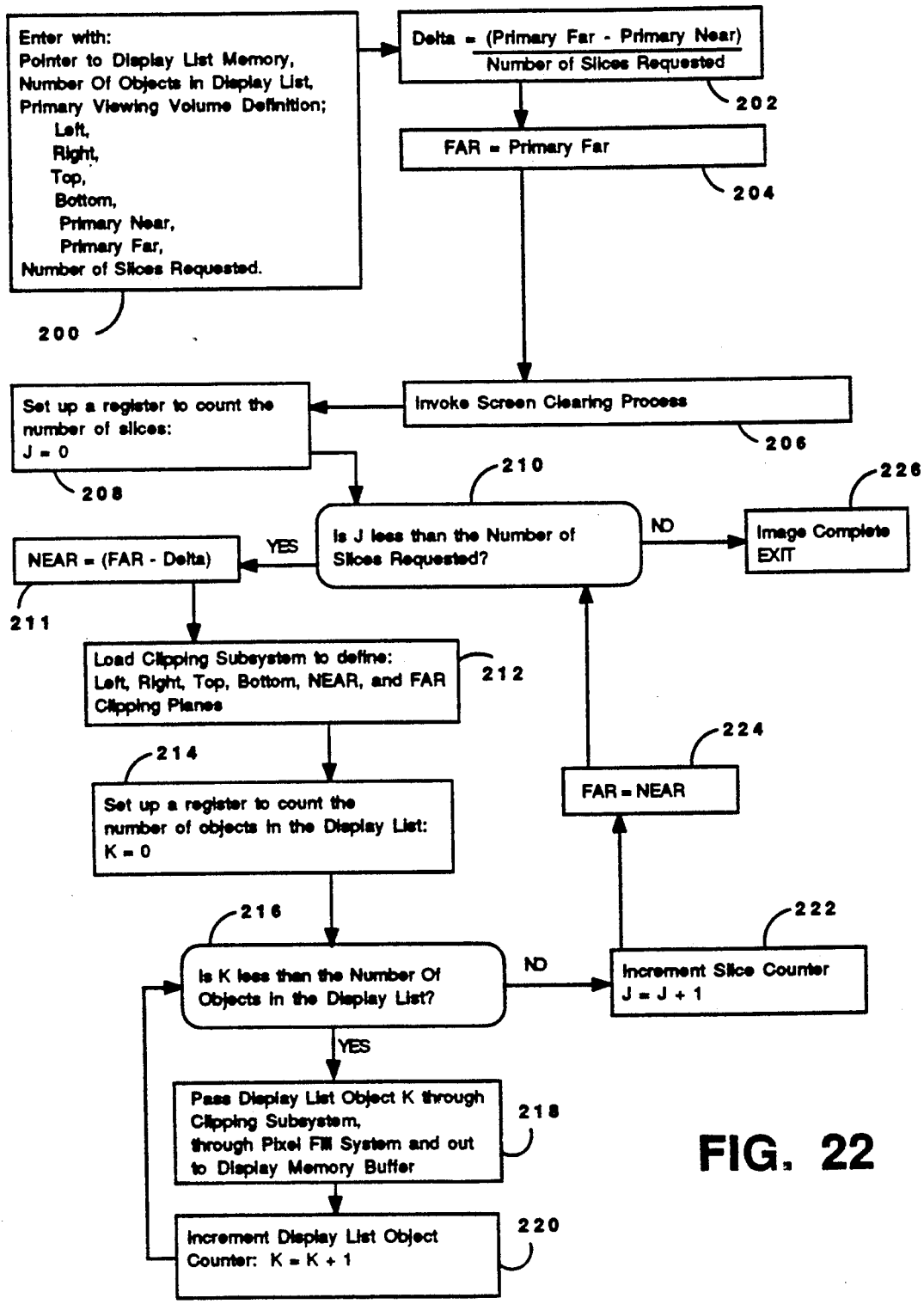
FIG. 22 is a flow chart showing the operation of the present invention.

FIG. 22 is a flow chart showing the operation of the hidden surface system control 134. The control is provided (block 200) with the address in memory of the start of the display list 100; the number of objects in the display list; the locations of the primary clipping planes T, B, L, R, PN, and PF; and the number of slices. The thickness of the slices (Delta) is then computed (block 202) by dividing the distance between the primary far and primary near clipping planes PF and PN by the number of slices. In the next step (block 204), the value of the first slice far clipping plane is stored. The display memory buffer 126 is then cleared, or each of its pixel registers are loaded with the value of the background screen color or color index (block 206). A register J is set up (block 208) for use as a slice loop counter to keep track of the number of slices processed. If the number of slices processed is less than the number of slices requested (decision block 210), the processing continues. If the number is the same, processing of the display list stops (block 226).

In the slice loop, the first step in processing a single slice (block 211) is the calculation of the location of the near clipping plane for this slice. The registers of the clipping subsystem 132 are then loaded to define this new slice's clipping volume (block 212). As illustrated in FIG. 7, the far clipping plane for the first slice passes through point P0 and the near clipping plane passes through the point P1. The distance between P0 and P1 is Delta—the thickness of the first slice.

Once in the slice loop, a register K is set up (block 214) as an object loop counter to keep track of the number of objects processed in the slice as the slice is processed. If the number of objects processed is less than the number of objects in the display list (decision block 216), processing of the slice continues. If the number is the same, processing of the slice stops (block 222).

In the object loop, the display list is fed to the clipping subsystem 132 an object at a time (block 218), where the object is processed creating a fraction of the final image and is loaded into the display memory buffer 126. When the processing of the object is completed, the register K is incremented (block 220). If additional objects remain to be processed (block 216), the next object from the display list is fed to the clipping subsystem 132.

When all of the objects in a given slice have been processed, the slice counter J is incremented (block 222) and the value in the near clipping plane controlling register is transferred to the far clipping plane controlling register (block 224). In this manner, the position of the near clipping plane of the preceding slice becomes the position of the far clipping plane for the subsequent slice. If the number of slices previously processed is less than the number of slices requested (decision block 210), the system returns to the slice loop to process the next slice. As shown in FIG. 7 for the second slice, the far clipping plane for the second slice passes through the point P1 and the near clipping plane passes through the point P2. The distance between P1 and P2 is again delta—the thickness of the second slice. This process continues through all of the slices until the results shown in FIG. 20 are obtained.

FIG. 23 is a chart of a Z schedule for another embodiment of the present invention. In this embodiment, the display list 100 is preprocessed to create a list of pointers to each object in each slice and the display is then created as described immediately above with the exception that each object referenced within the object loop (216 218 220) is referenced much more directly. As will be appreciated when dealing with most graphic images, many slices have no objects and few slices have all objects. By creating a list of pointers to each object in each slice, the time required for final processing of the display list for display on a graphic screen is minimized. The Z schedule shown in FIG. 23 is the result of preprocessing the display list for polygons PV and PH from viewpoint E in FIG. 7. For example, in the first and second slice there are no objects; in the third slice there is only one object—polygon PH. No portion of polygon PV is positioned in the third slice. Similarly, the eighth slice there is also only one object—again polygon PH. The ninth and tenth slices, as the first and second, contain no objects. All other slices contain portions of both polygons PH and PV.

Figure 24:
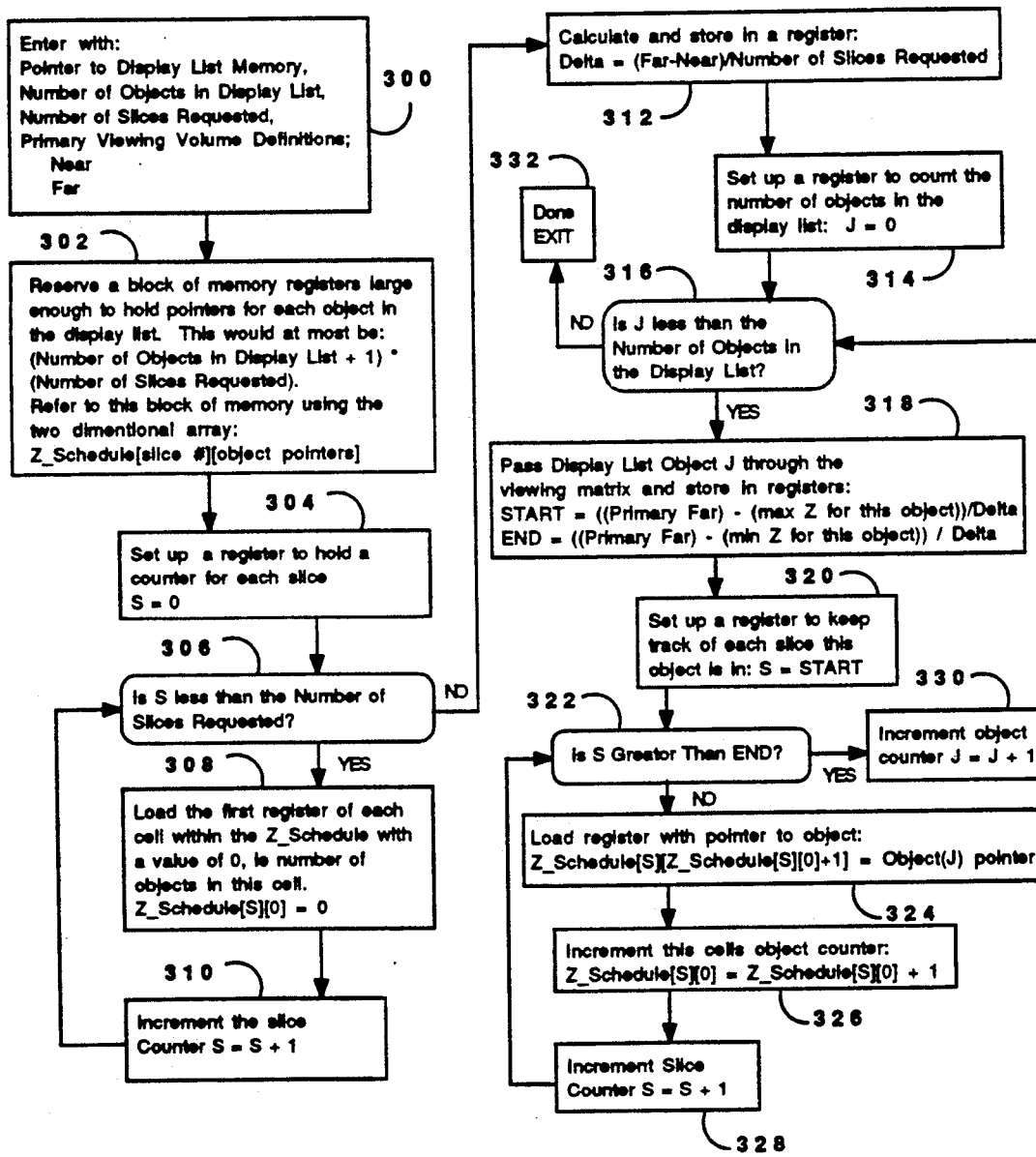
FIG. 24 is a flow chart showing how the Z schedule of FIG. 23 is created.

FIG. 24 is a flow chart showing how the Z schedule of FIG. 23 is created. The system is provided (block 300) with the address in memory of the start of the display list 100, the number of objects in the display list, the number of slices, and the locations of the primary near PN and primary far PF clipping planes. A section of memory is established to hold the Z schedule (block 302) with its object counters for each slice. A register is set up (block 304) for use as a counter to keep track of the number of slices processed.

The first loop (controlled by decision block 306) assigns an initial value of zero (block 308) to the object counter for each slice. As each object counter is set to zero, the counter is incremented (block 310) until all slice object counters are initialized.

The thickness of the slices (Delta) is computed (block 312) by dividing the distance between the primary far and primary near clipping planes PF and PN by the number of slices. The result is entered into a register. Another register is set up (block 314) to act as a loop counter for each of the objects within the display list 100.

The second loop (controlled decision block 316) examines each object on the display list, one at a time, with respect to the viewing volume (block 318) and identifies the starting and ending slices which contain this object. The position of these extremes is then referenced to particular slices by calculation and the values stored in registers. A subloop counter S is set up to keep track of the slices containing this object (block 320). Each of the slices containing this object is then referenced in the loop controlled by decision block 322. In this subloop, a pointer to the object is assigned in each of the slices that contain it (block 324). The number of objects in the particular slice, is then incremented (block 326), and the slice reference counter S is then incremented (block 328). When each of the slices containing the object have been assigned a pointer to the object, the object counter J is incremented (block 330) and the system returns to possibly process the next object (block 316). If no more objects remain to be processed, the system exits (block 332).

Figure 25:
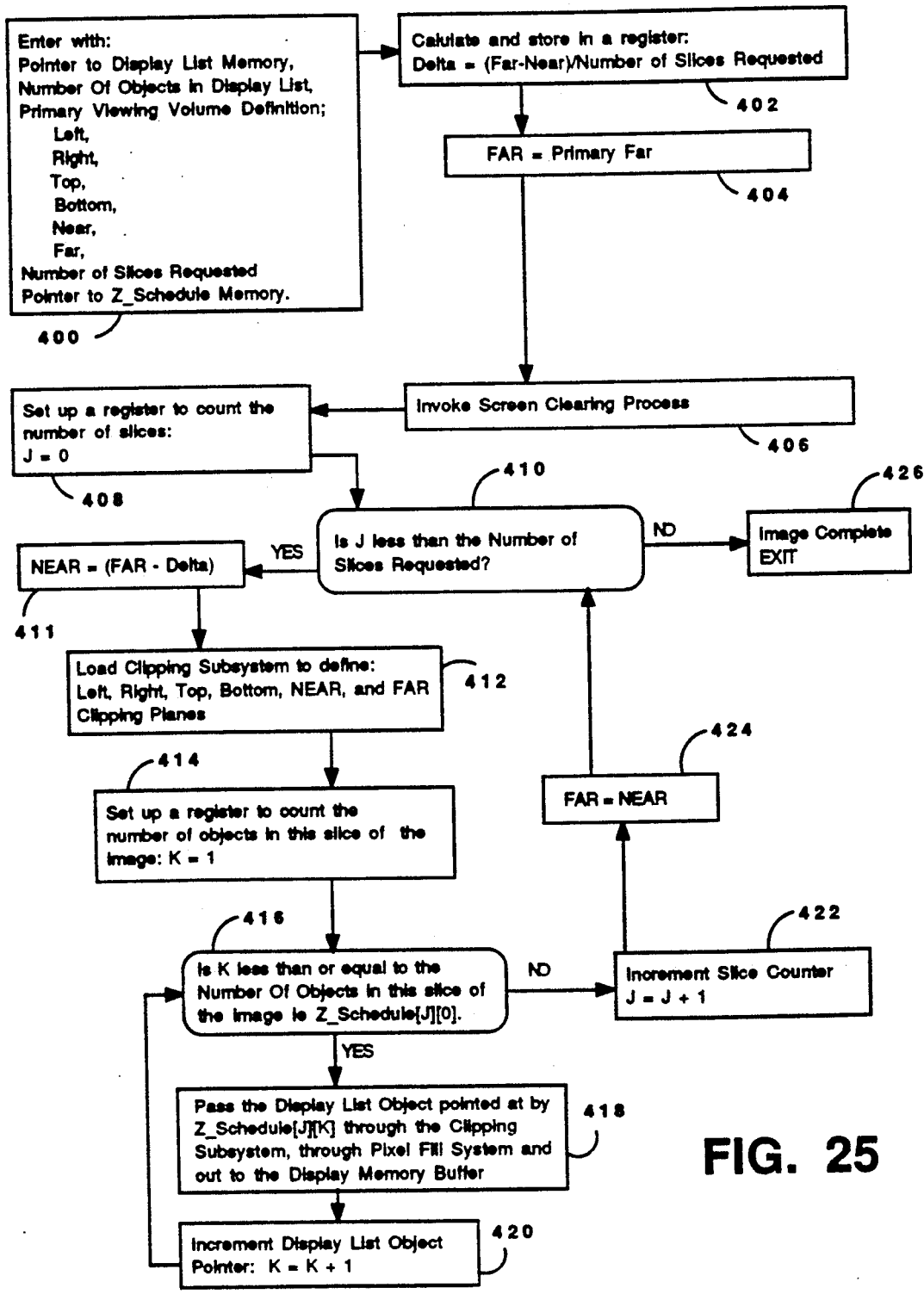
FIG. 25 is a flow chart showing the operation of another embodiment of the present invention.

FIG. 25 is a flow chart showing the operation of hidden surface system control embodiment of FIGS. 23 and 24. FIG. 25 is similar to FIG. 22 except that an address for the Z schedule is provided (block 400) in addition to the address of the start of the display list 100; the number of objects in the display list; the locations of the primary clipping planes T, B. L, R, PN, and PF; and the number of slices. Also, a register is set up (block 414) to count the number of objects in each slice instead of the number of objects in the display list (block 214). As each object on the display list is processed by the loop controlled by block 416, the objects are now accessed directly and only those objects within the slice are referenced.

Figure 26:
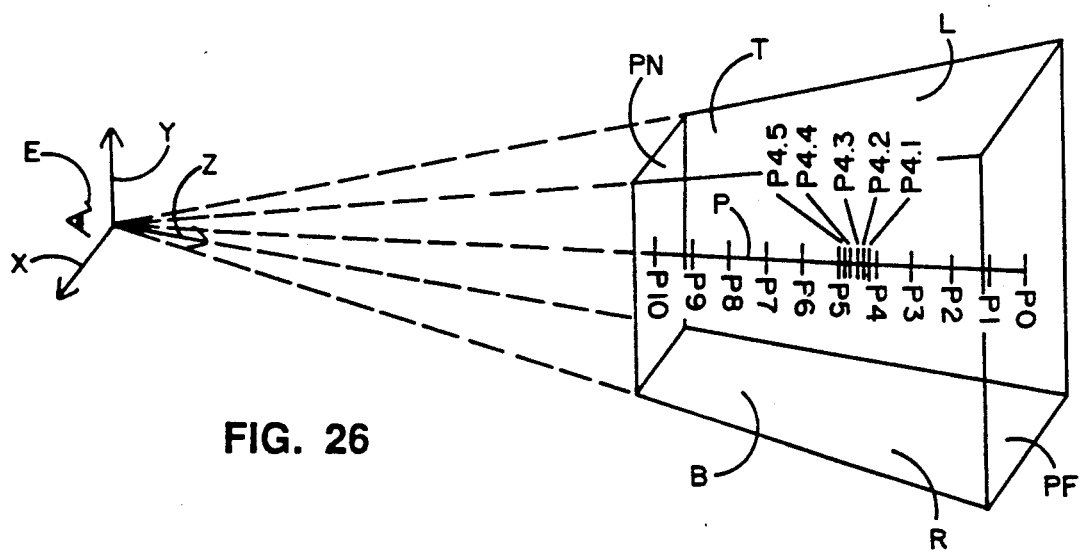
FIG. 26 is identical to FIG. 7 except for the addition of the subdivisions of the fifth slice.

FIG. 26 is identical to FIG. 7 except for the addition of the points P4.1 through P4.5. All of the above embodiments have been described using slices having equal thickness. The system and process of the present invention does not require the use of slices having equal thickness. In fact, there are often significant advantages to not always using equal slices.

In FIG. 26, the original fifth slice is divided into six new slices by passing new cutting planes through the points 4.1 through 4.5. The effect of increasing the number of slices is to decrease the thickness of the slices in this area, enhancing the precision of the objects depicted in the original fifth slice. If necessary additional cutting planes are established to further divide any slice until satisfactory results are achieved. In comparison, the Z buffer operates at only one level of precision over the entire display device.

Differences in the thickness of slices are achieved either automatically or manually by the system operator. In a preset automatic embodiment, the positions of each of the far and near clipping planes for each of the slices is specified in the Z schedule for processing the display list. In a preselected automatic object embodiment, the slices are equally thick except where a preselected object appears on the display list. All of the slices in which this object originally appears are automatically subdivided. For example, one object on a display screen is often of particular interest while most of the remaining objects are less important or serve as background. Assuming in FIG. 7 that this object appears in the original fifth slice between P4 and P5, additional precision is achieved in the depiction of the object by the further processing of this portion of the viewing volume when further divided at the points P4.1 through P4.5, but the precision over the remaining portions of the viewing volume remains the same.

In a manually controlled embodiment, the operator decreases or increases the number of slices by the use of a system input device while watching the results. If the operator sees that the results produced by the process are not satisfactory, as displayed on the display device, the display list can be reproduced with a greater number of slices in particular areas or totally.

All of the above embodiments paint the resulting images from the back of the primary viewing volume to the front. An alternative painting embodiment paints the images from the front to the back by the use of a bit used as a write protect flag for the contents of each of the pixel registers 128 (FIG. 21). During the paint process, the first time a pixel is lit by having its registers loaded with a color value, its write protect flag is set. Any subsequent changes are then barred at the same pixel while the processing of the slices moves from the foreground to the background. No pixel is repainted using this embodiment.

In view of the above, it may be seen that several embodiments of a computer graphics hidden surface removal system are provided. Of course, the structure and process may be variously implemented depending upon specific applications. Accordingly, the scope hereof shall not be referenced to the disclosed embodiments, but on the contrary, shall be determined in accordance with the claims as set forth below.

I claim:

1. A computer graphics hidden surface removal system for processing a display list representing a plurality of objects to provide an image on a display device, said system comprising:

means for determining a primary viewing volume in which said objects are located, the depth of said primary viewing volume being defined as the distance between parallel aligned primary far and primary near clipping planes;

means for dividing the primary viewing volume into a series of temporary viewing volumes having respective depths which are less than the depth of said primary viewing volume by successively relocating said primary far and primary near clipping planes to define the depth of each temporary viewing volume, with each of the relocated clipping planes being parallel to each other and to the primary far and near clipping planes of said primary viewing volume;

processing means to produce information signals that correspond to portions of the objects that are represented by the display list and located in the temporary viewing volumes; and display memory means into which the signals produced by said processing means are sequentially loaded for display at the display device.

2. The computer graphics hidden surface removal system recited in claim 1, further comprising preprocessing means to read the display list and index the objects represented thereby according to the location of such objects in said temporary viewing volumes.

3. The computer graphics hidden surface removal system recited in claim 2, wherein said processing means receives signals which are indicative of the objects indexed by said preprocessing means to reduce the size of the display list in which the objects are represented.

4. The computer graphics hidden surface removal system recited in claim 1, wherein the depths of the temporary viewing volumes are identical to one another.

5. The computer graphics hidden surface removal system recited in claim 4, wherein the depths of the temporary viewing volumes are not identical to one another.

6. A method for use in a computer graphics hidden surface removal system for processing a display list representing a plurality of objects to provide an image on a display device, said method comprising the steps of:

determining a primary viewing volume in which said objects are located, the depth of said primary viewing volume being defined as the distance between parallel aligned primary far and primary near clipping planes;

dividing the primary viewing volume into a series of temporary viewing volumes having respective depths which are less than the depth of the primary viewing volume;

providing information signals that correspond to portions of the objects that are represented by the display list and located in each of said temporary viewing volumes; and sequentially loading said information signals into a display memory for display at the display device.

7. The method for providing an image as recited in claim 6, including the additional steps of dividing the primary viewing volume into temporary viewing volumes by successively relocating the primary far and primary near clipping planes to define the depth of each temporary viewing volume, and aligning the relocated clipping planes to be parallel to each other and the primary far and primary near clipping planes of said primary viewing volume.

8. The method for providing an image as recited in claim 6, wherein the primary near clipping plane is closer to a reference point of view than the primary far clipping plane, said method comprising the additional step of dividing the primary viewing volume into said series of temporary viewing volumes in a direction starting from the primary far clipping plane and ending at the primary near clipping plane of said primary viewing volume.

9. The method for providing an image as recited in claim 6, including the additional steps of reading the display list and indexing the objects represented thereby according to the location of said objects in said temporary viewing volumes for reducing the size of the list in which the objects are represented.

10. The method for providing an image as recited in claim 6, including the additional step of dividing the primary viewing volume such that the depths of at least some of the temporary viewing volumes are identical to one another.

* * * * *